United States Patent [19] [11] 4,427,461
Kindlimann [45] Jan. 24, 1984

[54] NITRIDATION AND BRAZING OF ASSEMBLIES WITH TITANIUM-CONTAINING IRON BASED ALLOYS

[75] Inventor: Lynn E. Kindlimann, Woodland Hills, Calif.

[73] Assignee: The Garrett Corporation, Los Angeles, Calif.

[21] Appl. No.: 321,949

[22] Filed: Nov. 16, 1981

[51] Int. Cl.³ .................. C21D 1/48; B23K 31/02
[52] U.S. Cl. ............................ 148/16.6; 148/16.7; 148/127; 228/183
[58] Field of Search ............... 148/16.6, 16.7, 127; 228/183

[56] References Cited

U.S. PATENT DOCUMENTS

| | | | |
|---|---|---|---|
| 1,904,425 | 4/1933 | Egan | 148/16.6 |
| 1,961,520 | 6/1934 | Malcolm | 148/16.6 |
| 1,965,798 | 7/1934 | Egan | 148/16.6 |
| 2,864,731 | 7/1956 | Gurinsky et al. | 165/133 |
| 3,989,096 | 11/1976 | Allardyce et al. | 165/10 |
| 4,011,111 | 3/1977 | Hook | 148/16.6 |
| 4,042,428 | 8/1977 | Asai et al. | 148/16.6 |
| 4,082,575 | 4/1978 | Eastman | 148/16.6 |

OTHER PUBLICATIONS

Metals Handbook, 8th Ed., vol. 6, Welding and Brazing, American Society for Metals, pp. 663–668.

*Primary Examiner*—Veronica O'Keefe
*Attorney, Agent, or Firm*—Joseph A. Yanny; Donald W. Canady; James W. McFarland

[57] ABSTRACT

A method of internally nitriding and brazing assemblies having iron based components to which titanium has been internally added prior to casting. A brazed assembly includes iron based components to which titanium is added prior to casting and is dispersion strengthened by nitridation to form an array of titanium nitride particles.

24 Claims, No Drawings

NITRIDATION AND BRAZING OF ASSEMBLIES WITH TITANIUM-CONTAINING IRON BASED ALLOYS

The present invention relates to an economical process for nitriding and brazing steel assemblies having titanium as an alloy component and more specifically, to a process for making brazed heat exchanger assemblies having titanium nitride dispersion strengthened iron alloy components. The present invention also relates to assemblies made according to the method of the present invention and more specifically to brazed heat exchanger assemblies having titanium nitride strengthened iron alloy components.

The need for lightweight yet strong heat exchanger assemblies, particularly for vehicular applications, has become overly apparent in recent years. Equally important is the need to produce such assemblies in cost effective manners which minimize cost of materials, time of production, yet obtains products which match or exceed the high temperature properties and capabilities of assemblies made with yesterdays' technology.

Titanium nitride strenghtened iron based alloys have been shown to exhibit the strength characteristics necessary to meet today's requirements and yet remain lightweight and relatively inexpensive. See, Hook, A Formable-Strengthenable Sheet Steel, SAE Paper 740955, 1974. However, because of their superlative strength characteristics, these novel materials are inherently difficult to cut and shape in the nitrided state. It is therefore desirable to be able to perform the cutting and shaping operations upon the titanium containing alloy components when they are in their unnitrided state.

While it is desirable from the standpoint of stability to nitride titanium-containing steel alloys to about 0.05% nitrogen in excess of stoichiometric titanium-nitride, the general rule is that extreme overnitridation, i.e., the presence of nitrogen in excess of that required to ideally or stoichiometrically combine with the titanium present to form titanium nitride, is undesirable in that the alloy components have exhibited a tendency to become brittle, and in that the brazing process which is utilized in most heat exchanger fabrication processes is inhibited by over nitridation of certain elements of heat exchangers. It is, therefore, essential to sufficiently denitride the strengthened titanium-containing iron alloy components, i.e., remove the excess nitrogen from the alloy, in an atmosphere which tends to absorb lightly bonded nitrogen, at elevated temperatures, yet minimize the combined timed-temperature exposure of the titanium iron alloy components to prevent heat induced softening due to coarsening or growth of the array of titanium nitride dispersoid particles in the component elements.

Brazed assemblies of unnitrided titanium-containing iron based alloy components have shown a tendency to incompletely nitride when subjected to a nitriding atmosphere, at least in the areas which have become coated with a corrosion resistant film of brazing alloy. This phenomenon is due at least in part to the fact that suitable brazing alloys, after melting and fusing, are generally impervious to the passage of nitriding, oxidizing, or corrosive agents. So while it is desirable to braze assemblies of titanium-containing iron-based alloy components, to both join them and protect them from the high temperature oxidizing and corrosive environments of use, it is nearly imperative during fabrication to shape the alloy components before nitriding, and, to denitride the same components before brazing.

From a dimensional control and production logistics standpoint, it is desirable to treat assemblies as opposed to individually treating the component elements on a piecemeal basis. It is also desirable, at least from a logistics standpoint, to raise assemblies from an ambient temperature through a series of increasing temperatures, as opposed to a series of heating and cooling steps in which the temperature of the assembly is varied from ambient to a desired higher temperature and back to or near ambient temperature. This allows for production economy and minimizes the possibility of degradation of the titanium nitride strengthened ferrous alloy components due to excessive timed heat exposure.

The use of a powdered filler metal or brazing alloy which is relatively unaffected by the presence of nitrogen at the required nitriding temperatures, has proven desirable. Nitrided brazing alloys show a tendency to not wet and flow, and are therefore ineffective in achieving joining. Nickel base brazing alloys are suitable for these purposes and meet these requirements, although other elements will suffice as an alloy base. The most important factors in the selection of the brazing alloy base are that the brazing alloy must not melt or itself excessively nitride at the nitriding and denitriding temperatures critical to the process parameters for titanium-containing iron-based alloy elements. Additional care must also be taken to assure that the brazing alloy does not catalyze dissociation of the ammonia which is present in many suitable nitriding atmospheres.

Powdered brazing alloy, if properly selected, powdered and applied with a resin to heat exchanger elements, allows for: prebraze stacking of titanium-containing iron-based alloy component elements into a desired configuration, nitriding and denitriding of the configuration in atmospheres conducive thereto, and protective brazing of the configuration into an economical assembly.

The economical process of the present invention therefore comprises forming unnitrided titanium-containing iron based alloy component elements as required, coating the unnitrided titanium-containing alloy parts with a powder holding resin and a nickel (or other suitably) based brazing alloy powder which allows nitrogen to pass to the underlying titanium-containing iron based alloy parts, stacking the titanium-containing alloy parts into a desired configuration, and placing said configuration into a retort for final processing. The assembly is heated in an inert environment, i.e., one that does not oxidize or carburize the titanium-containing iron based alloy components, to about 1200° to 1300° F., and a hydrogen/ammonia atomic nitrogen yielding atmosphere is introduced into the retort. The atomic nitrogen yielding atmosphere is directed so that it flows over all surface areas of parts to be nitrided. After through-nitriding i.e., sufficiently exposing all titanium-containing iron based alloy component elements of the assembly to the atomic nitrogen yielding atmosphere for a sufficient amount of time to essentially saturate the parts and form the strengthening titanium nitride dispersed particles throughout, the ammonia flow into the retort is stopped while the hydrogen is allowed to continue to flow and the temperature of the retort is raised to the brazing temperature, i.e. the temperature at which the powdered brazing alloy melts and flows, without allowing a drop in temperature to ambient. During the period when the temperature is being raised from the nitriding to the brazing temperature, the hydrogen absorbs the excess lightly bonded nitrogen from the titanium-containing iron-based alloy components and the powdered brazing alloy before it reaches its melting point.

The brazed assembly of the present invention therefore comprises assemblies having titanium-modified iron based components manufactured in accordance with the method of the present invention.

DETAILED DESCRIPTION OF THE PREFERRED EMBODIMENT

The present invention is particularly designed for use in the manufacture of heat exchangers and accordingly contemplates use of lightweight thin gauge steel plates and fins.

The titanium-containing iron based components are first formed into desired shapes for use as heat exchanger plates. The plates are then coated with a sufficient amount of resin binder which serves to hold the brazing alloy in contact with the plates during the various stages of the manufacturing process. A similar operation may also be performed on the crowns of the stainless steel fins used in most heat exchangers if desired, but this is not normally necessary. The plates (and fins if desired) are then coated with a suitable brazing alloy powder and stacked in jigs to form a prebrazed heat exchanger assembly having a desired configuration. Any excess powder is removed by shaking the component plates and fins before assembly,.

With the present invention the parent titanium-containing iron-based steel plates preferably contain less than 2% but more than 0.3% free titanium by weight wherein free titanium is roughly defined as that titanium in the parent metal which is not combined with the other elements as taught in applicant's co-pending U.S. patent appication Ser. No. 933,396, filed Aug. 14, 1978 and entitled "Dispersion Strengthened Ferritic Stainless Steel", and incorporated by reference herein. Ideally, the free titanium content is between 0.9 to 1.25%. Deviations from these limits can cause a weakened parent metal. This weakening is due to, on the one hand, insufficient titanium nitride dispersoid strengthening elements if the free titanium is below 0.3%. On the other hand, free titanium in excess of 2% requires excessive timed-temperature exposure to through nitride and results in coarser titanium nitride particles which lead to reduced ductility in the final part. Ideally, the carbon level of the parent metal is also maintained at low levels to minimize formation of large titanium carbide particles which do not contribute to strengthening as also taught by applicant's co-pending U.S. patent application Ser. No. 933,396, and incorporated by reference.

Selection of an appropriate brazing alloy is important to the successful utilization of the present invention. The brazing alloy must, after brazing, provide a corrosion resistant layer on the parent titanium modified iron based metal, as well as join the component elements of the heat exchanger into a strong and durable assembly. However, before melting to effect joining, the brazing alloy must remain powdered, i.e., not wet the heat exchanger elements; not itself nitride during nitriding of the parent titanium-containing iron-based metal; and not substantially dissociate ammonia which is present in the preferred nitriding atmosphere. Additionally, the cost of the brazing alloy is a critical factor of selection. Nickel based brazing alloys have therefore been selected because of their perceived ability to meet the process requirements. Brazing alloy powders which are in the neighborhood of −140 mesh are preferred.

The jig containing the unnitrided heat exchanger is placed in a conventional retort and sealed. As the assembly is raised from the ambient temperature to the nitriding temperature, a hydrogen-ammonia, atomic nitrogen yielding atmosphere is introduced into the retort so that it flows over the entire surface of the parts to be nitrided. From experimentation it has been determined that the ideal nitriding temperature is in the neighborhood of 1300° Fahrenheit. However, anywhere from 1100° to 1400° F. will suffice. It is important to note that exposure of the titanium-containing alloy to nitriding temperatures in excess of 1400° F. tends to produce coarser titanium nitride particles with resulting lower strength; therefore it is imperative to nitride essentially within the desired temperature range, choosing a temperature that provides a balance between nitriding time and desired strength level.

The composition of the preferred nitriding atmosphere which contacts the assembly is 5-6% ammonia with the balance being hydrogen. It should be noted, however, that any atomic nitrogen yielding atmosphere that is otherwise essentially non-reactive with the parent metal, e.g. non-carburizing, non-sulfidizing, non-oxidizing etc., will suffice so long as the atomic nitrogen yield is sufficient to allow for through-nitriding of the parent titanium-containing metal without excessive timed heat exposure induced degradation thereof. From 4-7% ammonia content is recommended. The period during which the retort temperature is maintained at the nitriding temperature will be readily apparent to those skilled in the art as dependent upon a variety of known parameters such as the thickness of the parent metal, the amount of free titanium therein, the nitriding temperature, the nitrogen yield of the nitriding atmosphere, the properties desired in the finished product, and the nature of the brazing alloy.

After the assembly is sufficiently nitrided, the flow of ammonia to the retort is stopped and only the dry hydrogen is allowed to continue to flow over the surface of the assembly. The excess nitrogen in the parent titanium-containing metal, i.e., that amount which has been absorbed by the parent metal and which is in excess of that required to stoichiometrically combine with the free titanium in the parent metal to form titanium nitride, will be absorbed into the hydrogen denitriding atmosphere. The nitrogen will mix with the hydrogen and be swept away from the retort by the flowing gas.

The denitriding temperature varies and ideally the denitriding step takes place while the retort is raised from the nitriding temperature of around 1300° F. to the brazing temperature of around 2050° F. It is essential to keep the heating rate slow enough to allow the hydrogen denitriding atmosphere to react with the excess nitrogen in the parent metal, because after brazing, if a suitable brazing alloy is utilized, the parent metal will not easily further denitride because of the protective coating provided by the wetted braze alloy. The heating rate will obviously vary according to the wetting temperature of the braze alloy and the factors set forth with respect to the period of time which is required for brazing temperature to be maintained and vary from 110°-800° F. per hour. Heating rates of between 230°-740° F. per hour are perceived as most capable of producing materials having usable engineering properties. The ideal rate of heating is in the neighborhood of 500° F. per hour for ninety minutes.

Ideally the parent titanium-containing iron components are of a uniform thickness. This allows for uniform nitride strengthening of, and denitriding of, the assembly. Since, however, this is not always possible some deviation must be tolerated.

The selection of an appropriate braze alloy, as previously mentioned, is important to the proper utilization of the teachings of the present invention. Ideally, the braze alloy should not catalyze dissocation of ammonia at the nitriding stage. For this reason platinum, palladium, and iridium are undesirable as braze alloy components since they do catalyze the dissociation of ammonia.

Additional care must be taken to eliminate elements from the braze alloy which would, at the nitriding stage, themselves combine with the free nitrogen which is generated by the ammonia and prevent nitridation of the parent metal and possibly prevent wetting of the braze alloy. Particularly problematic in this regard is the presence of boron which even in small amounts absorbs free nitrogen preventing braze alloy wetting and makes more difficult and time consuming the nitriding process.

In a similar vein the brazing alloy must not have a melting point so low that sufficient denitriding does not occur before the brazing alloy flows and coats the parent metal with a protective layer that prohibits further denitriding. Ideally the braze alloy should not melt below 1900° F. although the denitriding problem can be solved, within limits, by adjusting the heating rate of the retort from nitriding temperature to the braze temperature to allow for sufficient denitriding when low melting point brazing alloys are used. It is recommended, however, that brazing alloys with melting points below 1750° F. not be used.

Since, however, it is desirable to limit the amount of time during which the titanium-containing alloy is exposed to temperatures in excess of 1300° F., and even more importantly to temperatures in excess of 1500° F. where titanium nitride particle softening rates increase, a quick rate of heating from the nitriding to brazing temperature is desirable. So while the present invention contemplates the use of nickel braze alloys have intentional additions of manganese, chromium and silicon which are known to lower the melting points of braze alloys, it is preferable to keep the melting point high enough to allow for complete denitriding.

Similarly, brazing alloys with melting points above 2200° F. are not recommended.

EXAMPLE 1

Tee specimens were made up using base plates of Type 444 stainless (18Cr-2Mo) steel, with the 0.9% free titanium alloy as the upright. Brazed powders were applied with a standard resin binder to one end of the two and one-half inch long uprights and they were then nitrided at 1300° F. in a 5.6% ammonia (balance hydrogen) atmosphere for times up to five hours. Nitriding was then stopped, and the ammonia shut off, followed by heating to 2100° F. and holding at that temperature for ten minutes, all in dry hydrogen. The results which illustrate the flow characteristics of the braze alloy when treated thusly are set forth and depicted as table I.

TABLE I

| Effect of Braze Alloy Composition on Braze Alloy Flow | | | | | | |
|---|---|---|---|---|---|---|
| Composition, Wt. % (Bal Ni) | | | | | Nitriding time | Results/ |
| Cr | Si | B | Mn | Fe | at 1300° F. Hrs. | Comments |
| 19.5 | 9.5 | — | 9.5 | | 5 | Flowed |
| 7 | 4.5 | 3 | — | 3 | 5 | Did not flow |
| 2 | 9.2 | 2.4 | — | 64.8 | 5 | Did not flow |
| 5.4 | 5.8 | 3.2 | — | 64.5 | 5 | Did not flow |
| 19.5 | 9.5 | — | 9.5 | — | 1 | Flowed |
| 7 | 4.5 | 3 | — | 3 | 1 | Did not flow |
| 2 | 9.2 | 2.4 | — | 64.8 | 1 | Did not flow |
| 5.4 | 5.8 | 3.2 | — | 64.5 | 1 | Did not flow |
| 19.5 | 9.5 | — | 9.5 | — | 1 | Flowed |
| 30 | 10 | — | — | — | 1 | Flowed |
| 19 | 10 | — | — | — | 1 | Flowed |
| 13 | 4 | 2.8 | — | 4 | 1 | Did not flow |
| — | 4.5 | 3 | — | 0.5 | 1 | Did not flow |
| 15 | — | 3.5 | — | — | 1 | Did not flow |
| 16.5 | 4 | 3.75 | — | 4 | 1 | Did not flow |

It should be noted that copper, silver and gold are also theoretical candidates for braze alloy constituents.

EXAMPLE 2

It has been determined that a hardness in excess of 85 HRB (hardness rockwell B) scale is desirable for the parent titanium nitride-containing iron-based alloys in the finished products. As previously mentioned, there exists an inverse relationship between the amount of time which the parent metal is exposed to temperatures in excess of 1300° F. (and even more pronounced when temperature exceeds 1500° F.) and the hardness which is obtained by the process as set forth. Various tests were run using different maximum temperatures with the process of the present invention on iron-0.9% titanium alloys for varying times of exposure. The results are set forth in Table II.

TABLE II

| Effect of Heating Time* on Hardness | | |
|---|---|---|
| Heating Time hrs. | Max. Temp °F. | HRB Hardness |
| 1.0 | 2100 | 94–95 |
| 4.0 | 2100 | 85–86 |
| 8.0 | 2100 | 82 |
| 4.0 | 2200 | 84–85 |
| 6.0 | 2200 | 79–82 |

*Heating from 1300° F. after nitriding, to brazing temperature shown and followed by immediate cooling (no hold at braze temperature). These samples were run bare without braze coating.

EXAMPLE 3

A third hardness and yield test was run on samples which were nitrided first then coated with a braze powder. These samples were run for varying times from the nitriding temperature of 1300° F. (reheated) to braze temperatures of from 2040° to 2100° F. max, with no hold at the braze temperature except for the 2040° F. test where a 10 minute hold was used. Room temperature tensile and hardness data are given below in Table III.

TABLE III

| Braze Temp | Time to Braze* | Ultimate | Yield | Hardness |
|---|---|---|---|---|
| 2040° F. | 90 min. | 97 KSI | 63 KSI | HRB 94 |
| " | " | 78 KSI | 60 KSI | HRB 88 |
| 2100° F. | 120 min. | 93 KSI | 51 KSI | HRB 91 |
| " | " | 89 KSI | 44 KSI | HRB 90 |
| " | 360 min. | 87 KSI | 43 KSI | HRB 90 |

TABLE III-continued

| Braze Temp | Time to Braze* | Ultimate | Yield | Hardness |
|---|---|---|---|---|
| " | " | 90 KSI | 50 KSI | HRB 88 |

*from 1300° F.

The present invention also encompasses a brazed assembly having iron based components to which titanium is added prior to casting. The assemblies are nitride strengthened and brazed according to a method, the parameters of which are set forth hereinabove with respect to the method of the present invention.

It will be apparent to those skilled in the art that the novel principles of the invention disclosed herein in connection with specific examples thereof will suggest various other modifications and applications of the same. It is accordingly desired that in construing the breadth of the appended claims they should not be limited to the specific examples of the invention described herein.

Wherein I claim:

1. A method for producing a brazed composite of a thin gauge nitride-strengthened titanium-containing iron-base alloy member with a second iron-base alloy member brazed thereto, comprising the sequential steps:
   (a) applying to a pre-formed thin gauge titanium containing iron-base alloy member which is pre-assembled to a second iron-based alloy member, a powdered brazing alloy melting in the temperature range of 1700° to 2200° F. and wettable on the surface of said members following nitridation.
   (b) heating said assemblage to a temperature in the range of about 1100° to 1400° F. in the presence of an atomic nitrogen-yielding atmosphere in a retort, for a time sufficient to combine substantially all of the free titanium in said titanium-containing iron base alloy member, with nitrogen,
   (c) further heating said assemblage in said retort to a temperature in the range of about 1700° to 2200° F. in a non-oxidizing atmosphere which is substatially free of atomic nitrogen, at a heating rate which will denitride metallic nitrides other than titanium nitride before the melting temperature of said brazing alloy is reached, without substantially softening said titanium-nitride strengthened base material, and
   (d) holding said assemblage in said 1700° to 2200° F. range until brazing of said titanium strengthened iron-based alloy member to said second member is accomplished.

2. The method of claim 1 wherein said assemblage is heated from said nitriding temperature to said brazing temperature at a rate of between 110° F. and 740° F. per hour.

3. The method of claim 2 wherein said heating rate is 400° to 550° F. per hour.

4. The method of claim 2 wherein said heating rate is approximately 500° F. per hour.

5. The method of claim 1 wherein said titanium containing iron-based alloy has a free-titanium content of between 0.3 and 2 weight percent.

6. The method of claim 1 wherein said titanium containing iron-base alloy has a free-titanium content of between 0.9 and 1.25 weight percent.

7. The method of claim 1 wherein said nitriding temperature is from about 1300° to 1350° F.

8. The method of claim 1 wherein said atomic nitrogen-yielding atmosphere is a mixture of ammonia and hydrogen 9. The method of claim 1 wherein said atomic nitrogen-yielding atmosphere is a mixture of about 4 to 7 percent ammonia, balance hydrogen.

10. The method of claim 1 wherein said brazing alloy is a −140 mesh powder admixed with a resin binder.

11. The method of claim 1 wherein said brazing alloy powder is substantially free of boron and has a melting temperature of above 1700° F.

12. The method of claim 1 wherein said brazing alloy is an alloy which is not susceptible to nitridation.

13. The method of claim 1 wherein said brazing alloy is an alloy which can wet said titanium containing iron-based alloy base metal in the temperature range of 1700° to 2200° F.

14. The method of claim 1 wherein said denitriding and brazing steps are performed in a hydrogen atmosphere.

15. The method of claim 1 wherein said brazing alloy contains nickel, chromium and silicon.

16. The method of claim 1 wherein said brazing alloy contains nickel, chromium, silicon and a metal selected from the group consisting of manganese, gold and copper or mixtures thereof.

17. A method for producing a brazed heat exchanger structure comprised of a thin gauge nitride-strengthened titanium-containing iron-based alloy plate with a stainless steel fin brazed thereto, comprising the sequential steps:
   (a) applying a substantially boron-free brazing alloy powder melting in the temperature range of 1700° to 2200° F., to a pre-formed titanium containing iron-base alloy plate which is preassembled to a stainless steel fin,
   (b) heating said assemblage to a temperature in the range of about 1100° to 1400° F. in the presence of an atomic nitrogen-yielding atmosphere in a retort, for a time sufficient to combine with nitrogen, substantially all of the free titanium in said titanium-containing iron-base metal plate,
   (c) further heating said assemblage to a temperature in the range of about 1700° to 2200° F. in a non-oxidizing atmosphere which is substantially free of atomic nitrogen, at a heating rate which will denitride metallic nitrides other than titanium nitrides, before the melting temperature of said brazing alloy is reached, without substantially softening said titanium nitride-strengthened iron-base alloy plate, and
   (d) holding said assemblage in said 1700° to 2200° F. temperature range until brazing of said stainless steel fin to said pre-formed nitride-strengthened plate member is accomplished.

18. A method for producing a brazed heat exchanger structure comprised of thin gauge nitride-strengthened titanium containing stainless steel plate modified with about 0.9% free titanium, with a stainless steel fin brazed thereto, comprising the steps:
   (a) applying a nickel base brazing alloy powder consisting essentially of about 19–30% chromium, 9–10% silicon, 0–10% manganese, balance nickel, to a pre-formed titanium-containing stainless steel plate which is preassembled to a stainless steel fin member,
   (b) heating said assemblage to the temperature range of 1100° to 1400° F. in the presence of a mixture of ammonia and hydrogen in a retort, for time sufficient to combine with nitrogen, substantially all of the free titanium in said titanium-modified stainless steel plate, (c) further heating said assemblage in an atmosphere to which ammonia has not been added, to about 2000° F. at a heating rate which will denitride metallic nitrides other than titanium nitride before the melting temperature of said brazing alloy is reached, without substantially softening said titanium nitride strengthened plate member, and (d) holding said assemblage at a temperature of about 2050° F. to effect brazing of said fin member to said pre-formed nitride-strengthened plate member.

19. A brazed article comprised of a thin gauge pre-formed titanium nitride-strengthened iron-base alloy member which is pre-coated with a substantially boron free nickel base brazing alloy melting in the range of 1700° to 2200° F., and nitrided in-situ by heating said member preassembled to a second iron-base alloy member, to a temperature of about 1100° to 1400° F. in the presence of an atomic nitrogen-yielding atmosphere for time sufficient to combine with nitrogen, substantially all of the free titanium in said thin gauge titanium nitride-strengthened iron-based metal, said thin gauge member being brazed to said second member at a temperature between 1700° and 2200° F.

20. A brazed heat exchanger assemblage comprised of a thin gauge pre-formed titanium nitride-strengthened iron-base alloy plate member which is pre-coated with a substantially boron-free nickel base brazing alloy melting in the range of 1700° to 2200° F., and nitrided in situ by heating said plate member pre-assembled to a stainless steel fin member, to a temperature in the range of about 1100° to 1400° F. in the presence of an atomic nitrogen-yielding atmosphere for a time sufficient to combine with nitrogen, substantially all of the free titanium in said plate member, and said thin gauge plate member being brazed to said fin member in the temperature range of 1700° to 2200° F.

21. The article of claim 19 wherein said plate member prior to the nitriding, has a free-titanium content of from 0.3 to 2 weight percent.

22. The article of claim 19 wherein said plate member prior to nitriding, has a free-titanium content of from 0.9 to 1.25 weight percent.

23. The article of claim 19 wherein said article is brazed with a brazing alloy which is not susceptible to nitridation.

24. The article of claim 19 wherein said article is brazed with a brazing alloy containing nickel, chromium and silicon.

* * * * *